US012340666B2

(12) United States Patent
Carey

(10) Patent No.: US 12,340,666 B2
(45) Date of Patent: *Jun. 24, 2025

(54) INVESTIGATION GENERATION IN AN OBSERVATION AND SURVEILLANCE SYSTEM

(71) Applicant: James Carey, Commack, NY (US)

(72) Inventor: James Carey, Commack, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,629

(22) Filed: Jan. 23, 2024

(65) Prior Publication Data

US 2024/0161567 A1 May 16, 2024

Related U.S. Application Data

(63) Continuation of application No. 16/846,568, filed on Apr. 13, 2020, now Pat. No. 11,881,090, which is a
(Continued)

(51) Int. Cl.
*G06V 20/52* (2022.01)
*G06Q 20/20* (2012.01)
(Continued)

(52) U.S. Cl.
CPC ............. *G07F 9/026* (2013.01); *G06Q 20/20* (2013.01); *G06V 20/13* (2022.01); *G06V 20/17* (2022.01);
(Continued)

(58) Field of Classification Search
None
See application file for complete search history.

(56) References Cited

U.S. PATENT DOCUMENTS 6,975,346 B2    12/2005   Kumhyr
7,308,487 B1    12/2007   Dansie et al.
(Continued)

FOREIGN PATENT DOCUMENTS

RU     2309674 C2    11/2007
RU       83675 U1     6/2009
(Continued)

OTHER PUBLICATIONS

Anonymous: "Configuration Backup Restore", Jun. 30, 2010 (Jun. 30, 2010), XP055127450, retrieved from the Internet: URL:https://downloads.avaya.com/css/P8/documents/100088380 [retrieved on Jul. 8, 2014].
(Continued)

*Primary Examiner* — Tsung Yin Tsai
(74) *Attorney, Agent, or Firm* — Carter, DeLuca & Farrell LLP

(57) ABSTRACT

The present disclosure is directed to systems and methods for generating investigations of user behavior. In an example embodiment, the system includes a video camera configured to capture video of user activity, a video analytic module to perform real-time video processing of the captured video to generate non-video data from video, and a computer configured to receive the video and the non-video data from the video camera. In some embodiments, the video camera is at least one of a traffic camera or an aerial drone camera. The computer includes a video analytics module configured to analyze one of video and non-video data to identify occurrences of particular user behavior, and an investigation generation module configured to generate an investigation containing at least one video sequence of the particular user behavior. In some embodiments, the investigation is generated in near real time. The particular user behavior may be defined as an action, an inaction, a movement, a plurality of
(Continued)

event occurrences, a temporal event and/or an externally-generated event.

18 Claims, 4 Drawing Sheets

Related U.S. Application Data continuation of application No. 16/251,233, filed on Jan. 18, 2019, now Pat. No. 10,657,755, which is a continuation-in-part of application No. 15/729,135, filed on Oct. 10, 2017, now Pat. No. 10,347,070, which is a continuation of application No. 14/213,548, filed on Mar. 14, 2014, now Pat. No. 9,786,113.

(60) Provisional application No. 61/798,740, filed on Mar. 15, 2013.

(51) Int. Cl.
| | |
|---|---|
| *G06V 20/13* | (2022.01) |
| *G06V 20/17* | (2022.01) |
| *G07F 9/02* | (2006.01) |
| *G07F 19/00* | (2006.01) |
| *G07G 3/00* | (2006.01) |
| *G08B 13/196* | (2006.01) |
| *H04N 7/18* | (2006.01) |

(52) U.S. Cl.
CPC ............ *G06V 20/52* (2022.01); *G07F 19/207* (2013.01); *G07G 3/003* (2013.01); *G08B 13/19608* (2013.01); *G08B 13/19613* (2013.01); *H04N 7/181* (2013.01); *G08B 13/1965* (2013.01)

(56) References Cited

U.S. PATENT DOCUMENTS

| | | | |
|---|---|---|---|
| 7,613,322 | B2 | 11/2009 | Mn et al. |
| 7,801,330 | B2 * | 9/2010 | Zhang .................... G06T 7/215 |
| | | | 348/169 |
| 7,868,912 | B2 | 1/2011 | Venetianer et al. |
| 8,107,677 | B2 | 1/2012 | Angell et al. |
| 8,564,661 | B2 | 10/2013 | Lipton et al. |
| 9,158,975 | B2 * | 10/2015 | Lipton ............... G08B 13/1968 |
| 9,363,487 | B2 | 6/2016 | Chosak et al. |
| 9,602,700 | B2 | 3/2017 | Ahiska |
| 9,762,865 | B2 | 9/2017 | Carey |
| 9,786,113 | B2 | 10/2017 | Carey |
| 9,805,273 | B1 | 10/2017 | Seeber et al. |
| 10,043,360 | B1 * | 8/2018 | Mullins ............. G08B 13/1968 |
| 10,347,070 | B2 | 7/2019 | Carey |
| 10,522,013 | B2 | 12/2019 | Gordon-Carroll et al. |
| 10,657,755 | B2 | 5/2020 | Carey |
| 10,846,971 | B2 | 11/2020 | Carey |
| 11,756,367 | B2 | 9/2023 | Carey |
| 11,881,090 | B2 | 1/2024 | Carey |
| 2003/0095687 | A1 | 5/2003 | Montgomery |
| 2004/0130620 | A1 | 7/2004 | Buehler et al. |
| 2004/0161133 | A1 | 8/2004 | Elazar et al. |
| 2004/0268156 | A1 | 12/2004 | Sakakibara et al. |
| 2005/0146605 | A1 * | 7/2005 | Lipton ............. G08B 13/19615 |
| | | | 375/E7.006 |
| 2005/0162515 | A1 | 7/2005 | Venetianer |
| 2005/0169367 | A1 | 8/2005 | Venetianer |
| 2006/0243798 | A1 | 11/2006 | Kundu et al. |
| 2006/0262958 | A1 | 11/2006 | Mn et al. |
| 2007/0003141 | A1 | 1/2007 | Rittscher et al. |
| 2007/0013776 | A1 | 1/2007 | Venetianer |
| 2007/0052803 | A1 | 3/2007 | Chosak et al. |
| 2007/0057049 | A9 | 3/2007 | Kundu et al. |
| 2007/0058040 | A1 | 3/2007 | Zhang et al. |
| 2007/0127774 | A1 | 6/2007 | Zhang et al. |
| 2007/0182818 | A1 | 8/2007 | Buehler |
| 2007/0297607 | A1 | 12/2007 | Ogura et al. |
| 2008/0018738 | A1 | 1/2008 | Lipton et al. |
| 2008/0106599 | A1 | 5/2008 | Liu et al. |
| 2008/0198231 | A1 | 8/2008 | Ozdemir et al. |
| 2008/0263610 | A1 | 10/2008 | Murray et al. |
| 2008/0303902 | A1 | 12/2008 | Romer et al. |
| 2009/0002155 | A1 | 1/2009 | Ma et al. |
| 2009/0033745 | A1 | 2/2009 | Yeredor et al. |
| 2009/0208054 | A1 | 8/2009 | Angell |
| 2009/0222388 | A1 | 9/2009 | Hua et al. |
| 2009/0222466 | A1 | 9/2009 | Allison et al. |
| 2010/0026802 | A1 | 2/2010 | Titus et al. |
| 2010/0059589 | A1 * | 3/2010 | Goncalves ........... G07G 1/0054 |
| | | | 382/218 |
| 2010/0079594 | A1 | 4/2010 | Voglewede et al. |
| 2010/0135643 | A1 | 6/2010 | Fleming |
| 2010/0182428 | A1 | 7/2010 | Lu et al. |
| 2010/0321183 | A1 | 12/2010 | Donovan et al. |
| 2011/0211070 | A1 | 9/2011 | Shu et al. |
| 2011/0219385 | A1 | 9/2011 | Jacobson et al. |
| 2012/0008836 | A1 | 1/2012 | Bobbitt et al. |
| 2012/0127314 | A1 | 5/2012 | Clements |
| 2012/0127316 | A1 | 5/2012 | Kundu et al. |
| 2012/0208592 | A1 | 8/2012 | Davis et al. |
| 2012/0221687 | A1 | 8/2012 | Hunter et al. |
| 2012/0229647 | A1 | 9/2012 | Calman et al. |
| 2012/0233032 | A1 | 9/2012 | Calman et al. |
| 2012/0233033 | A1 | 9/2012 | Calman et al. |
| 2012/0262575 | A1 | 10/2012 | Champagne et al. |
| 2012/0311564 | A1 | 12/2012 | Khalid |
| 2012/0320199 | A1 | 12/2012 | Kundu et al. |
| 2012/0324061 | A1 | 12/2012 | Parsons et al. |
| 2012/0327241 | A1 | 12/2012 | Howe |
| 2013/0021434 | A1 | 1/2013 | Ahiska |
| 2013/0027561 | A1 | 1/2013 | Lee et al. |
| 2013/0041961 | A1 | 2/2013 | Thrower, III et al. |
| 2013/0182905 | A1 | 7/2013 | Myers |
| 2013/0223688 | A1 | 8/2013 | Golan |
| 2014/0014722 | A1 * | 1/2014 | Goncalves ............. G06V 20/52 |
| | | | 235/383 |
| 2014/0227671 | A1 | 8/2014 | Olmstead et al. |
| 2014/0267735 | A1 | 9/2014 | Carey |
| 2015/0279155 | A1 | 10/2015 | Chun et al. |
| 2015/0341599 | A1 | 11/2015 | Carey |
| 2017/0256148 | A1 * | 9/2017 | King .................... G08B 13/196 |
| 2017/0337790 | A1 | 11/2017 | Gordon-Carroll et al. |
| 2017/0337791 | A1 | 11/2017 | Gordon-Carroll |
| 2017/0337805 | A1 | 11/2017 | Eyring et al. |
| 2018/0165733 | A1 | 6/2018 | Kundu et al. |
| 2019/0088096 | A1 * | 3/2019 | King ................ G08B 13/19665 |
| 2019/0172293 | A1 | 6/2019 | Carey |
| 2020/0170093 | A1 | 5/2020 | Mirsky et al. |
| 2020/0242876 | A1 | 7/2020 | Carey |

FOREIGN PATENT DOCUMENTS

| | | |
|---|---|---|
| RU | 2459267 C2 | 8/2012 |
| RU | 124017 U1 | 1/2013 |
| WO | 2007139994 A2 | 12/2007 |
| WO | 2012102909 A1 | 8/2012 |
| WO | 2012151651 A1 | 11/2012 |
| WO | 2012170551 A2 | 12/2012 |
| WO | 2013030296 A1 | 3/2013 |
| WO | 2014155958 A1 | 10/2014 |

OTHER PUBLICATIONS

Extended European Search Report for corresponding application No. EP 14 76 4242 dated Aug. 26, 2015.

International Search Report for PCT/US14/28940 dated Aug. 27, 2014.

Daniel A. Vaquero et al., "Attribute-Based People Search," Chapter 14, Intellegent Video Surveillance: Systems and Technology, published Dec. 7, 2009, pp. 387-405.

European Office Action dated Feb. 9, 2017 in corresponding European Patent Application No. 14764242.5, 8 pages.

(56) References Cited

OTHER PUBLICATIONS

Song et al., "Real-Time Monitoring for Crowd Counting Using Video Surveillance and GIS," IEEE, 2nd International Conference on Remote Sensing, Environment and Transportation Engineering (RSETE), Jun. 1, 2012, 4 pages.
Smith, K., et al. "Detecting Abandoned Luggage Items in a Public Space," IEEE Performance Evaluation of Tracking and Surveillance Workshop (PETS), IDIAP Research Report, Jun. 2006, pp. 1-14.
Russian Office Action issued on Nov. 11, 2016 in corresponding Russian Patent Application No. 2015138958 including English translation, 14 pages.
Canadian Office Action issued on Jan. 24, 2017, in corresponding Canadian Patent Application No. 2,861,652, 3 pages.
Canadian Office Action dated Apr. 18, 2019 issued in corresponding CA Appln. No. 3,010,108.
International Search Report for corresponding application No. EP 14 76 4242 dated Aug. 26, 2015.
Canadian Office Action issued Jan. 24, 2017 in corresponding Canadian Patent Application No. 2,861,652, 3 pages.
European Office Action issued in corresponding European Patent Application No. 14764242.5, 8 pages.
Extended European Search Report dated Oct. 9, 2019 issued in corresponding EP Appln. No. 19192551.0-1217.
European Search Report dated Feb. 25, 2020 issued in corresponding EP Appln. No. 20152129.1.
Brazilian Office Action dated May 20, 2020 issued in corresponding BR Appln. No. 112015023693.6.
Russian Office Action dated Nov. 11, 2016 in corresponding Russian Patent Application No. 2015138958 including English translation, 14 pages.
Canadian Office Action dated Jan. 24, 2017, in corresponding Canadian Patent Application No. 2,861,652, 3 pages.
Extended European Search Report dated Feb. 25, 2020 issued in corresponding EP Appln. No. 20152129.1.
Office Action dated Feb. 4, 2021 issued in coresponding RU Appln. No. 2017137406.
Canadian Office Action dated Sep. 2, 2021 issued in corresponding CA Appln. No. 3,091,605.
European Examination Report dated Aug. 19, 2021 issued in corresponding EP Appln. No. 19192551.0.
European Examination Report dated Dec. 21, 2021 issued in corresponding EP Appln. No. 20 152 129.1.
Office Action issued in corresponding Canadian Application No. 3,091,605 dated Apr. 11, 2023 (5 pages).

\* cited by examiner

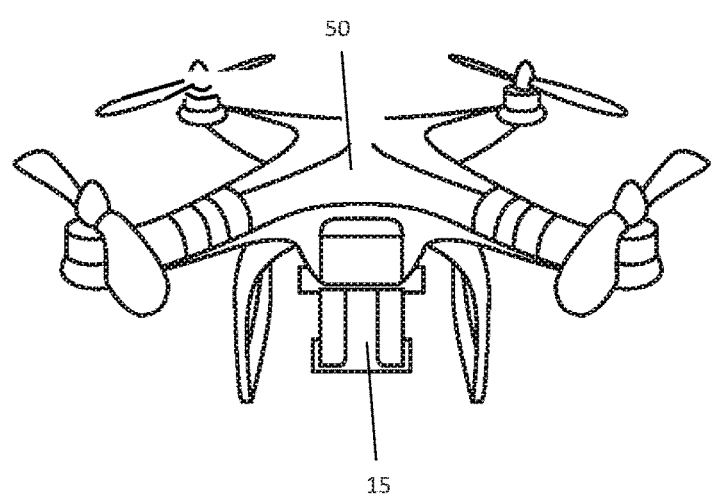
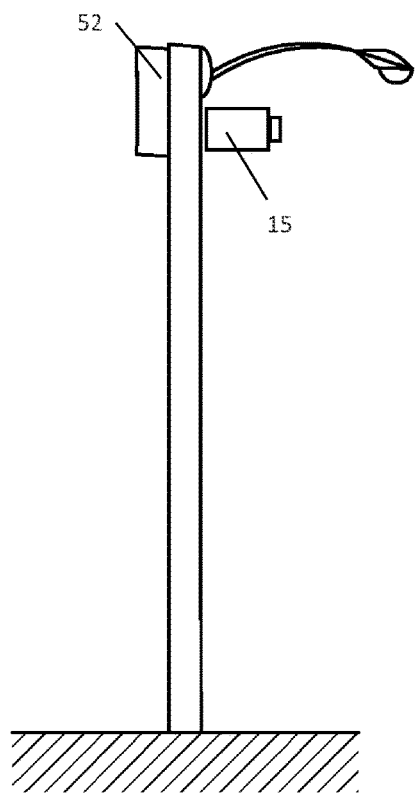
FIG. 4A
FIG. 4B

INVESTIGATION GENERATION IN AN OBSERVATION AND SURVEILLANCE SYSTEM

CROSS REFERENCE TO RELATED APPLICATION

The present application is a continuation of U.S. patent application Ser. No. 16/846,568 filed on Apr. 13, 2020, now U.S. Pat. No. 11,881,090, which is a continuation of U.S. patent application Ser. No. 16/251,233 filed on Jan. 18, 2019, now U.S. Pat. No. 10,657,755, which is a continuation-in-part of U.S. patent application Ser. No. 15/729,135, filed on Oct. 10, 2017, now U.S. Pat. No. 10,347,070, which is a continuation of U.S. patent application Ser. No. 14/213,548, filed on Mar. 14, 2014, now U.S. Pat. No. 9,786,113, which claims the benefit of and priority to U.S. Provisional Application Ser. No. 61/798,740, filed on Mar. 15, 2013. The disclosures of all of the foregoing applications are hereby incorporated by reference herein in their entireties for all purposes.

BACKGROUND

1. Technical Field

The following relates to video observation, surveillance and verification systems and methods of use. The specific application may work in conjunction with a system providing external data such as, for example, a point of sale (POS) transaction system that will be described herein, however, information may be provided from any external data system related to transactions in health care facilities, restaurants, and the like.

2. Background of Related Art

Companies are continually trying to identify specific user behavior in order to improve the throughput and efficiency of the company. For example, by understanding user behavior in the context of the retail industry, companies can both improve product sales and reduce product shrinkage. Focusing on the latter, employee theft is one of the largest components of retail inventory shrink. Therefore, companies are trying to understand user behavior in order to reduce and ultimately eliminate inventory shrinkage.

Companies have utilized various means to prevent employee shrinkage. Passive electronic devices attached to theft-prone items in retail stores are used to trigger alarms, although customers and/or employees may deactivate these devices before an item leaves the store. Some retailers conduct bag and/or cart inspections for both customers and employees while other retailers have implemented loss prevention systems that incorporate video monitoring of POS transactions to identify transactions that may have been conducted in violation of implemented procedures. Most procedures and technologies focus on identifying individual occurrences instead of understanding the underlying user behaviors that occur during these events. As such, companies are unable to address the underlying condition that allows individuals to commit theft.

SUMMARY

Embodiments described herein may be framed in the context of retail shrinkage, although the systems and methods described herein can be applied to other retail or service industries such as health care facilities, restaurants, and the like.

In one aspect, the present disclosure is directed to a system to generate real-time investigations of user behavior. In an example embodiment, the system includes a video camera configured to capture video of user activity, a video analytic module to perform real-time video processing of the captured video to generate non-video data from video, and a computer configured to receive the video and the non-video data from the video camera. In some embodiments, the video camera is at least one of a traffic camera or an aerial drone camera. The computer includes a video analytics module configured to analyze one of video and non-video data to identify occurrences of particular user behavior, and an investigation generation module configured to generate an investigation containing at least one video sequence of the particular user behavior. In some embodiments, the investigation is generated in near real time. The particular user behavior may be defined as an action, an inaction, a movement, a plurality of event occurrences, a temporal event and/or an externally-generated event.

In some embodiments, the investigation generation module assigns externally-generated data to the investigation. In some embodiments, the computer receives the externally-generated data from a POS system and the externally-generated data includes at least one POS transaction. In some embodiments, the particular user behavior may be defined by a model of the particular user behavior. In embodiments, the video analytics module includes a comparator module configured to compare the model of a particular user behavior and the non-video data.

In some embodiments, the investigation generation module is configured to simultaneously manage and populate a plurality of investigations.

In another aspect, the present disclosure is directed to a system to generate real-time investigations of user behavior. An example embodiment of the system includes a video camera configured to capture video of user activity, a video analytic module to perform real-time video processing of the captured video to generates non-video data from video, and a computer configured to receive the video and the non-video data from the video camera. In some embodiments, the video camera is at least one of a traffic camera or an aerial drone camera. The computer includes a video analytics module configured to analyze one of video and non-video data to identify occurrences of particular user behavior, and an investigation generation module configured to assign a video sequence related to the identified occurrence of particular user behavior to an investigation. In some embodiments, investigation is generated in near real time. In some embodiments, the investigation generation module assigns externally-generated data to the investigation. In some embodiments, the computer receives the externally-generated data from a POS system. The externally-generated data includes at least one POS transaction.

In some embodiments, the investigation generation module is configured to simultaneously manage and populate a plurality of investigations. In some embodiments, the particular user behavior is defined as at least one of an action, an inaction, a movement, a plurality of event occurrences, a temporal event and an externally-generated event. In some embodiments, the particular user behavior is defined by a model of the particular user behavior. The video analytics module includes a comparator module configured to compare the model of the particular user behavior and the non-video data.

In yet another aspect, the present disclosure is directed to a method of observing behavior. In an example embodiment, the method includes receiving video from a camera, and generating non-video data from the video. In some embodiments, the camera is at least one of a traffic camera or an aerial drone camera. The non-video data includes non-video data related to user behavior. The method includes identifying a particular user behavior, identifying at least one occurrence of the particular user behavior within the video data, and generating an investigation related to the particular user behavior.

In some embodiments, the method includes defining the particular user behavior as at least one of an action, an inaction, a movement, a plurality of event occurrences, a temporal event, and an externally-generated event.

In still another aspect, the present disclosure is directed to non-transitory computer-readable medium comprising software for monitoring a point of sale (POS) transaction, which software, when executed by a computer system, causes the computer system to receive video from a camera, generate non-video data from the video identifying a particular user behavior, identify an occurrence of the particular user behavior contained within the non-video data, and generate an investigation related to the identified occurrence of the particular user behavior. In some embodiments, the camera is at least one of a traffic camera or an aerial drone camera. In some embodiments, the investigation includes video of the occurrence of the particular user behavior contained within the non-video data. In some embodiments, the software causes the computer system to receive externally-generated POS transaction data from a POS systems that includes at a least one individual transaction. In some embodiments, the software causes the computer to identify the particular user behavior temporally related to the at least one individual transaction. In some embodiments, the software causes the computer to provide data related to the at least one individual transaction to the investigation. In some embodiments, the software causes the computer to define the particular user behavior as at least one of an action, an inaction, a movement, a plurality of event occurrences, a temporal event and an externally-generated event.

In a further aspect of the present disclosure, an example embodiment of a non-transitory computer-readable medium includes software for monitoring user behavior, which software, when executed by a computer system, causes the computer system to receive non-video data from a camera wherein the non-video data includes user behavioral information data, identify a particular user behavior, identify an occurrence of the particular user behavior within the non-video data, identify video of the identified occurrence of the particular user behavior, and generate an investigation related to the identified occurrence of the particular user behavior, the investigation including the identified video. In some embodiments, the camera is at least one of a traffic camera or an aerial drone camera. In some embodiments, the software causes the computer to define the particular user behavior as at least one of an action, an inaction, a movement, a plurality of event occurrences and a temporal event and an externally-generated event. In some embodiments, the particular user behavior is defined by a model of the particular user behavior. The occurrence identification step includes comparing the model of the particular user behavior to the non-video data. In some embodiments, the software causes the computer to receive externally-generated data from a POS system, wherein the externally-generated data includes at least one POS transaction, and identify an occurrence of the particular user behavior within the non-video data related to the at least one POS transaction. In some embodiments, the software causes the computer to provide data related to the at least one POS in the investigation.

A "video camera" may refer to an apparatus for visual recording. Examples of a video camera may include one or more of the following: a video imager and lens apparatus; a video camera; a digital video camera; a color camera; a monochrome camera; a camera; a camcorder; a traffic camera, an aerial drone camera, a PC camera; a webcam; an infrared (IR) video camera; a low-light video camera; a thermal video camera; a closed-circuit television (CCTV) camera; a pan/tilt/zoom (PTZ) camera; and a video sensing device. A video camera may be positioned to perform observation of an area of interest.

"Video" may refer to the motion pictures obtained from a video camera represented in analog and/or digital form. Examples of video may include: television; a movie; an image sequence from a video camera or other observer; an image sequence from a live feed; a computer-generated image sequence; an image sequence from a computer graphics engine; an image sequence from a storage device, such as a computer-readable medium, a digital video disk (DVD), or a high-definition disk (HDD); an image sequence from an IEEE 1394-based interface; an image sequence from a video digitizer; or an image sequence from a network.

"Video data" is a visual portion of the video.

"Non-video data" is non visual information extracted from the video data.

A "video sequence" may refer to a selected portion of the video data and/or the non-video data.

"Video processing" may refer to any manipulation and/or analysis of video data, including, for example, compression, editing, and performing an algorithm that generates non-video data from the video.

A "frame" may refer to a particular image or other discrete unit within video.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software;

code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that may store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

BRIEF DESCRIPTION OF THE DRAWINGS

FIG. 4A is a perspective view of an aerial drone according to the present disclosure; and FIG. 4B is a perspective view of a traffic camera according to the present disclosure.

DETAILED DESCRIPTION

Figure 1:
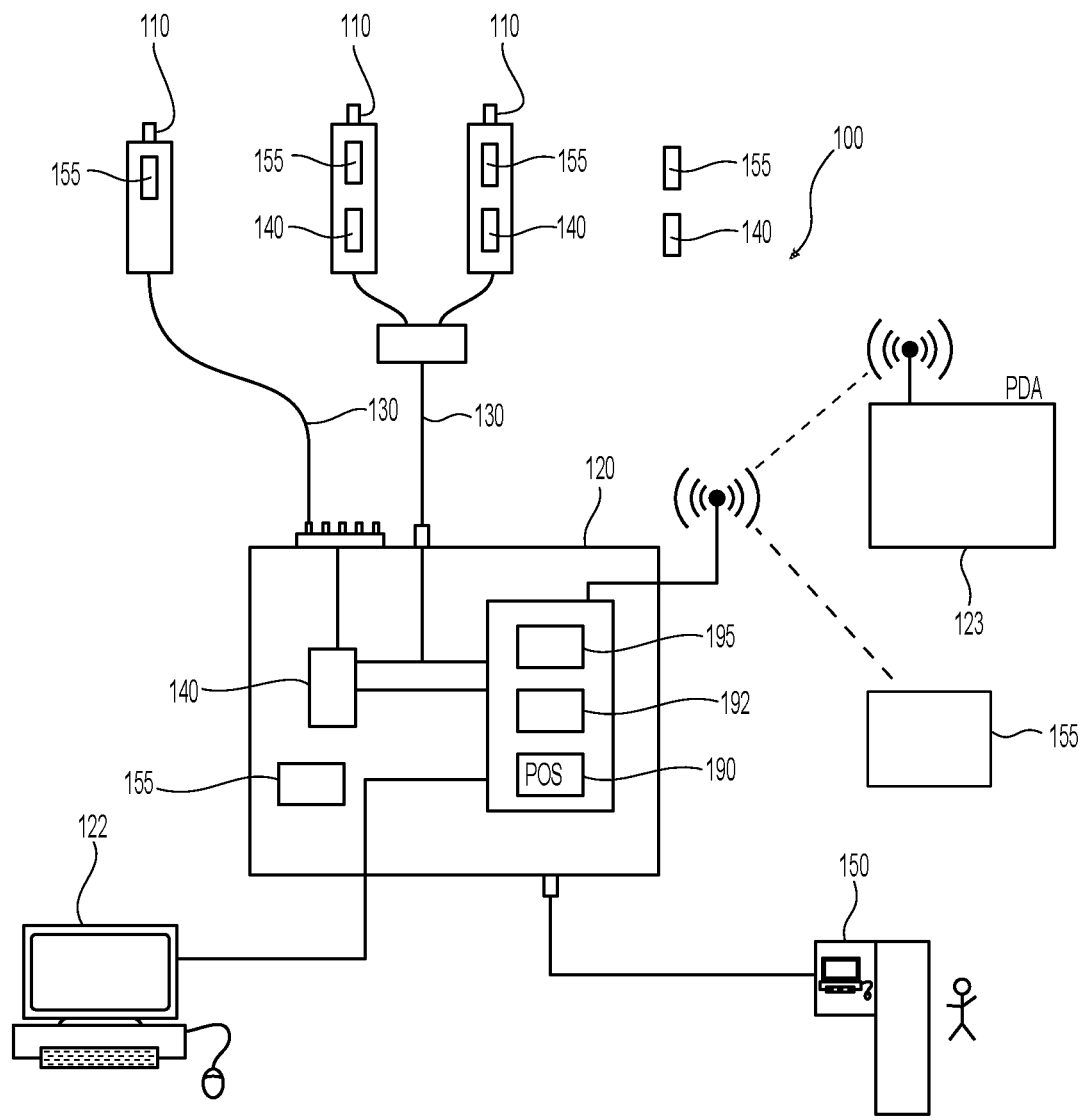
FIG. 1 is a system block diagram of an embodiment of a video observation, surveillance and verification system in accordance with the present disclosure.

Particular embodiments of the present disclosure are described hereinbelow with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions.

Additionally, the present disclosure may be described herein in terms of functional block components, code listings, optional selections, page displays, and various processing steps. It should be appreciated that such functional blocks may be realized by any number of hardware and/or software components configured to perform the specified functions. For example, embodiments of the present disclosure may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed on a variety of operating systems including, without limitation, Windows®, Macintosh OSX®, iOS®, linux, and/or Android®.

Further, it should be noted that embodiments of the present disclosure may employ any number of conventional techniques for data transmission, signaling, data processing, network control, and the like. It should be appreciated that the particular implementations shown and described herein are illustrative of the disclosure and its best mode and are not intended to otherwise limit the scope of the present disclosure in any way. Examples are presented herein which may include sample data items (e.g., names, dates, etc.) which are intended as examples and are not to be construed as limiting. Indeed, for the sake of brevity, conventional data networking, application development and other functional aspects of the systems (and components of the individual operating components of the systems) may not be described in detail herein. Furthermore, the connecting lines shown in the various figures contained herein are intended to represent example functional relationships and/or physical or virtual couplings between the various elements. It should be noted that many alternative or additional functional relationships or physical or virtual connections may be present in a practical electronic data communications system.

As will be appreciated by one of ordinary skill in the art, the present disclosure may be embodied as a method, a data processing system, a device for data processing, and/or a computer program product. Accordingly, the present disclosure may take the form of an entirely software embodiment, an entirely hardware embodiment, or an embodiment combining aspects of both software and hardware. Furthermore, embodiments of the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., USB thumb drives) and/or the like.

In the discussion contained herein, the terms "user interface element" and/or "button" are understood to be non-limiting, and include other user interface elements such as, without limitation, a hyperlink, clickable image, and the like.

Embodiments of the present disclosure are described below with reference to block diagrams and flowchart illustrations of methods, apparatus (e.g., systems), and computer program products according to various aspects of the disclosure. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, mobile device or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

With reference to FIG. 1, a video observation, surveillance and verification system according to an embodiment of this disclosure is shown as 100. System 100 is a network video recorder that includes the ability to record video from one or more cameras 110 (e.g. analog and/or IP camera) and other data obtained by way of one or more antennae 155.

System 100 includes one or more video cameras 110 that connect to a computer 120 across a connection 130. Connection 130 may be an analog connection that provides video to the computer 120, a digital connection that provides a network connection between the video camera 110 and the computer 120, or the connection 130 may include an analog connection and a digital connection.

System 100 may include one or more video cameras 110 wherein each video camera 110 connects to the computer 120 and a user interface 122 to provide a user connection to the computer 120. The one or more video cameras 110 may each connect via individual connections, may connect through a common network connection, or through any combination thereof.

The one or more antennae 155 may be affixed to, or included within, the one or more video cameras 110 or the computer 120, and/or may be located remote from the one or more video cameras 110 and the computer 120. The one or more antennae 155 may be communicatively coupled to the computer 120 by way of the connection 130 or may wirelessly communicate with the computer 120 by way of an antenna of the computer 120.

The one or more antennae 155 may be any one or a combination of various types of antennae. Example types of the one or more antennae 155 include a WiFi antenna, a media access control (MAC) antenna, a Bluetooth antenna, a cellular antenna, a near field communication antenna, a radio frequency identification (RFID) antenna, and a global positioning system (GPS) antenna. It should be understood that the example arrangement of the antennae 155 shown in FIG. 1 is provided for illustrative purposes only, and other configurations of the antennae 155 are contemplated. For instance, a single camera 110 may include a plurality of antennae of different types.

As discussed in more detail herein, the one or more antennae 155 are configured to capture mobile communication device data from one or more mobile communication devices (e.g., smartphones) located within a range of the one or more antennae 155 and transmit the captured mobile communication device data to a video data analytics module 140 for processing in accordance with various example embodiments herein. The antenna 155 may be configured to capture the mobile communication device data by wirelessly receiving data transmitted by a mobile communication device that is located within a range of the antenna. The antenna 155 may be configured to wirelessly receive data from nearby mobile communication devices by periodically or continually pinging mobile communication devices and/or by being configured to periodically or continually listen for and capture data transmitted by nearby mobile communication devices without using pinging.

System 100 includes at least one video analytics module 140. A video analytics module 140 may reside in the computer 120 and/or one or more of the video cameras 110. Video analytics module 140 performs video processing of the video. In particular, video analytics module 140 performs one or more algorithms to generate non-video data from video. Non-video data includes non-video frame data that describes content of individual frames such as, for example, objects identified in a frame, one or more properties of objects identified in a frame and one or more properties related to a pre-defined portions of a frame. Non-video data may also include non-video temporal data that describes temporal content between two or more frames. Non-video temporal data may be generated from video and/or the non-video frame data. Non-video temporal data includes temporal data such as a temporal properties of an object identified in two or more frame and a temporal property of one or more pre-defined portions of two or more frames. Non-video frame data may include a count of objects identified (e.g., objects may include people and/or any portion thereof, inanimate objects, animals, vehicles or a user defined and/or developed object) and one or more object properties (e.g., position of an object, position of any portion of an object, dimensional properties of an object, dimensional properties of portions and/or identified features of an object) and relationship properties (e.g., a first object position with respect to a second object), or any other object that may be identified in a frame. Objects may be identified as objects that appear in video or objects that have been removed from video.

Video analytics module 140 positioned in a camera 110 converts video to video data and non-video data and the camera 110 and provides the video data and the non-video data to the computer 120 over a network. As such, the system 100 distributes the video processing to the edge of the network thereby minimizing the amount of processing required to be performed by the computer 120.

Computer 120 may connect to an external system 150 that provides information related to the video. For example, external system 150 may include a POS system that provides POS transaction information to the computer. Computer 120 may include a POS module 190 that receives POS transaction information and converts the POS transaction information into events. For example, the POS module 190 may receive data descriptions of the content of the POS data. The POS module 190 generates events based on user defined behavior discussed hereinbelow.

Computer 120 includes computer-readable medium comprising software for monitoring user behavior, which software, when executed by a computer 120, causes the computer 120 to perform operations. User interface 122 provides an interface to the computer 120. User interface 122 may connect directly to the computer 120 or connect indirectly to the computer 120 through a user network.

A user behavior is defined by an action, an inaction, a movement, a plurality of event occurrences, a temporal event, an externally-generated event or any combination thereof. A particular user behavior is defined and provided to the computer 120.

An action may include reaching for an object such as selecting a product from a retail shelf or retrieving an order ticket at a deli counter. An action may include picking up an object wherein the object has been placed or left at a particular location. An action may include moving a particular object such as the opening of a door, drawer or compartment. An action may include positioning (or repositioning) a body part such as placing a hand in a pocket after conducting retail transaction. The action may include moving to a particular position, a first individual engaging a second individual and/or moving a hand, arm, leg and/or foot in a particular motion. An action may also include positioning a head in a particular direction, such as, for example, looking directly at a manager's office or security camera 110. Other examples are discussed hereinbelow. Actions may also include motions that result in unsanitary conditions such as deli employees touching their faces during the process of filling deli orders.

Inaction may include failing to reach for an object wherein an object is dropped or positioned and the individual (e.g., object) does not retrieve the dropped object. Inaction may also include failing to perform a task that requires action, such as, for example, failing to offer a sales receipt, change or cash back requested by a customer during a debit transaction. Inaction may also include failing to place cash received from a customer into a register and/or cash slot. Inaction may also include failing to make an observation that requires movement of the body or head, such as, for example, looking under a shopping cart during a retail transaction. Inaction may also include failing to walk to a particular location or failure to perform a particular task. For example, confirming that a security door is locked would require the action of approaching the door and the action of striking the door to ensure that it would not open. As such, the user behavior may be defined as the inaction of approaching the door and/or the inaction of striking the door to confirm that the door will not open. In a health facility, an example of an inaction is failing to swipe a membership access card, indicative of a non-member entering the facility. An example of an inaction is a security guard failing to patrol assigned areas at specified intervals or at specified times.

A movement may include movement generated by an electronic system, such as, for example, advancing a portion of a customer receipt after a product is scanned or unwinding of a lottery ticket roll. Movement may also include the movement of items on a conveyor after a POS transaction.

A plurality of event occurrences may be a combination of related individual events. For example, a plurality of events may include events that require manager review or a plurality of events may include the removal of an object from a security case and a subsequent POS transaction or a POS transaction that does not include an item located in the security case.

A temporal event may include the identification of a customer that abruptly leaves a store, an individual dwelling at a store entrance or exit, an individual remaining in a particular location for an time period exceeding a threshold.

Externally-generated events may include transactions provided from a POS system, an environmental control system (e.g., heating, cooling and/or lighting) or any other system capable of generating and/or providing external events. Externally-generated events may be provided via any suitable connection, such as, for example, a hardwired connection and/or a network.

A user identifies a particular user behavior and provides and/or defines characteristics of the particular user behavior in the computer 120. Computer 120 receives non-video data from the camera 110 wherein the non-video data includes behavioral information data. The particular user behavior may be defined by a model of the behavior where the model includes one or more attribute such a size, shape, length, width, aspect ratio or any other suitable identifying or identifiable attribute. The computer 120 includes a matching algorithm or module 195, such as a comparator, that compares the defined characteristics and/or model of the particular user behavior with user behavior in the defined n the non-video data. Indication of a match by the matching algorithm 195 generates an investigation wherein the investigation includes the video data and non-video data identified by the matching algorithm 195. Matching algorithm 195 may be configured as an independent module or incorporated into the video analytics module 140 in the computer 120 or in any cameras 110.

A particular user behavior may be defined as the placement of a cashier's hand into a pocket within a preselected period after a POS transaction. This particular user behavior is indicative of a cashier failing to return the correct change to a customer and "pocketing" the difference. The video analytics module 140 performs an algorithm to generate non-video data that identifies the cashier, identifies the cashier's hand and the movement of the cashier's hand. The POS module 190 using data provided from the external system 150 (e.g., POS system) identifies an event that corresponds to the completion of a POS transaction and the matching algorithm 195 searches the non-video data within the predetermined period of time after the completion of the POS transaction to determine if the cashier's hand is placed in their pocket. A temporal match in a POS transaction and hand placement in a pocket results in the generation of an investigation.

Video analytics module 140 may include a comparator module 192 configured to compare the model of the particular user behavior and the non-video data.

A particular user behavior may be defined as positioning a head toward an observation camera 110 exceeds a preset period or positioning of a head directly toward a manager's office exceeds a preset period. This particular user behavior is indicative of a customer trying to identify the cameras 110 in a store in an effort to prevent being detected during a theft or an employee trying to determine if a manager is observing their behavior. The video analytics module 140 performs an algorithm to generate non-video data that identifies the head position of objects. The video analytic module 140 may also provide a vector indicating the facial direction. The matching algorithm 195 searches the non-video data to determine if the head position and/or vector indicating facial direction exceeds the preset period. A match results in the generation of an investigation.

A particular user behavior may be defined as a cashier failing to provide a customer with cash back after a cash back debit card purchase (e.g., an inaction). A cash back debit transaction requires a cashier to perform two motions. The first motion is removing cash from the cash drawer and the second motion is providing the cash to the customer. Failing to complete the first and second motions after a cash back debit card transaction is indicative of a customer not receiving cash back from the transaction. The video analytics module 140 performs an algorithm to generate non-video data that identifies the cashier, identifies the cashier's hand and the movement of the cashier's hand. The POS module 190 identifies an event that corresponds to the completion of a cash back POS transaction and the matching algorithm 195 searches the non-video data within the predetermined period after the completion of the POS transaction to determine if the cashier's hand performed the first and second motions. A match results in the generation of an investigation.

Investigations are a collection of data related to an identified event. The investigation simply documents behaviors of interest. As such, investigations require further review and investigation to understand the particular behavior. Investigations may document customer preferences such as why a customer selected a particular item, how a customer shops for a particular item, and the amount of packaging detail a customer seeks before completing a selection. Other non-retail examples include how customers select a table in a restaurant, the amount of time a customer spends reading a particular advertisement or which movie poster attracts customers' interests while walking to a movie.

In some instances, investigations uncover criminal activity. For example, an investigation generated after identifying the user behavior of placing a cashier's hand into a pocket within a preselected period after a POS transaction includes a video sequence of the POS transaction. The investigation may also include a report of the POS transaction. A loss prevention individual is notified of the newly opened investigation and the investigation can be reviewed through any suitable user interface (e.g., computer, tablet PC, IPad, hand-held smart device or any other suitable device).

The loss prevention individual receives the investigation within seconds of the actual event. The video processing, POS transaction and processing, the matching algorithm 195 and generation of the investigation occur in near real time. As such, the investigation that includes all data and video required to view and assess the user behavior is electronically transmitted to the loss prevention individual's user interface.

An investigation generated after identifying the positioning of a head toward an observation camera 110 for a preset period or positioning of a head directly toward a manager's office for a preset period may include a plurality of video sequences related to the particular behavior. For example, an investigation is opened upon identification of the first occurrence of the user behavior. The investigation remains open and subsequent occurrences of behavior (e.g., the same and/or other related behavior) enters additional video sequences into the investigation. The loss prevention individual is notified of the open investigation and may observe the further investigation while the system 100 continues to populate the investigation with video sequences.

An investigation is populated with one or more video sequences of a particular individual that demonstrates a user behavior or the investigation is populated with video sequences of any individual that demonstrates the user behavior. For example, shrinkage may be a result of a single criminal or from a group of criminals working together. As such, the system 100 may be configured to populate the investigation with video from any individuals that exhibit similar behavior, or investigations may be opened for a group of individuals that enter the store together or make contact with each other in the store.

The system 100 provides the loss prevention individuals with tools, discussed hereinbelow, to amend and/or add to the contents of an investigation. For example, a loss prevention individual may add a video sequence or clip that clearly identifies the user's face, a video sequence that shows the individual entering the store and/or a video sequence that identifies additional criminal conduct. The loss prevention individual may also remove or amend a video sequence automatically entered into the investigation by the system 100.

An investigation may be connected to a particular employee. Employee may be identified by an identification number, such as, for example, an identification number entered into the POS system. The investigation may remain open thereby forming an ongoing investigation that is populated with additional video sequences as behaviors of the particular employee are observed. For example, an employee may be the target of an ongoing internal investigation. As such, video sequences identified by the system are entered into the ongoing internal investigation related to this particular employee wherein POS data is used to identify the employee.

Figure 2:
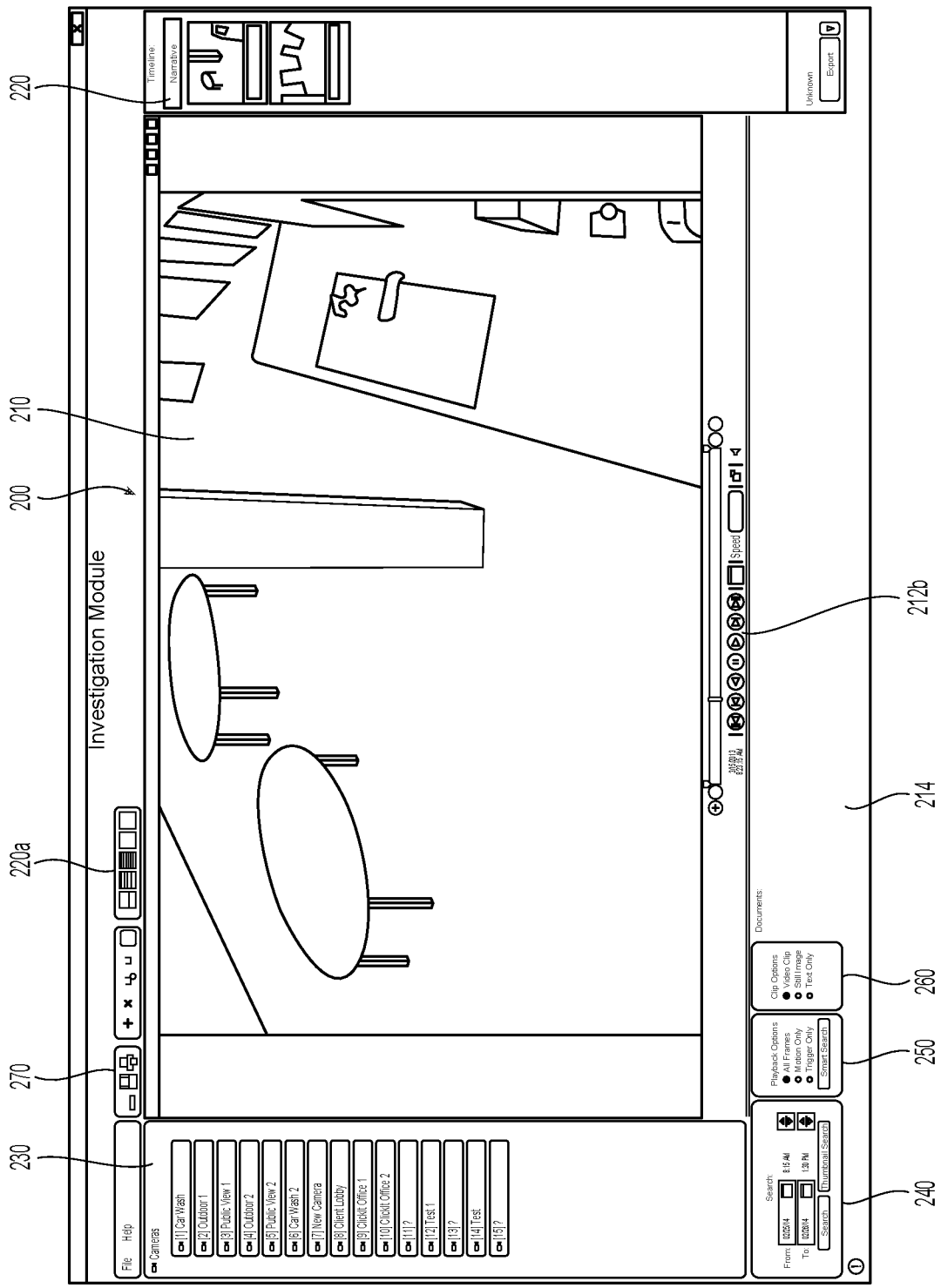
FIG. 2 is a screen-shot of an embodiment of an investigation module 200 displaying an investigation in accordance with the present disclosure.

FIG. 2 is a screen-shot of the investigation module 200 displaying an investigation generated in accordance of an embodiment of this disclosure. Investigation module 200 is configured to generate and store information required to document a particular user behavior.

Investigation module 200 includes a viewing window 210 with upper and lower viewing control bars 212a, 212b, a text entry window 214, a timeline window 220, a camera window 230, a search window 240, a playback option window 250, a clip option window 260 and a file maintenance window 270.

Investigations automatically generated by the system 100 are populated with information related to the particular user behavior as discussed hereinabove. For example, the investigation illustrated in FIG. 2 includes a first video sequence 220a and a second video sequence 220b wherein the first video sequence 220a is from the downstairs camera and the second video sequence 220b is from a camera located at the elevator. In one embodiment, the first video sequence 220a was provided through an automatically generated investigation and the automatically generated investigation was provided to the loss prevention individual.

The first video sequence 220a is selected in the timeline window 220 and played in the viewing window 210. To further this explanation and for example, suppose the loss prevention individual, upon viewing the first video sequence 220a on a PDA 123, observes an individual removing a company laptop computer from the downstairs area. In generating the investigation, the system identified this user behavior as a particular user behavior and upon review, the loss prevention individual concurs that the automatically generated investigation has merit and escalated the automatically generated investigation to a theft investigation.

Keep in mind, the automatically generated investigation was provided to the loss prevention individual in near real-time, therefore, the individual now in possession of the company laptop may have only taken a few steps from where the laptop was removed.

Using the PDA 123, the loss prevention individual furthers the automatically generated investigation (now a theft investigation) by observing temporally related video and video data available through the investigation module 200 on a PDA 123.

The search window 240 may automatically select a timeframe related to the investigation. The timeline may be manually controlled through the PDA 123.

Video and/or video data from one or more cameras listed in the camera window 230 may be selected for viewing in the viewing window 210. A plurality of video streams from individual cameras (see FIG. 1) may be viewed simultaneously by selecting an alternative viewing screen from the upper viewing control bar 212a.

The lower viewing control bar 212b allows viewing video in the viewing window 210 in real time or other selected speeds. The investigation module 200 provides an investigation playback speed wherein the playback speed is automatically calculated to replay video at a playback speed that requires the loss prevention individual to view every frame of the video sequence. Video is recorded and saved at speeds that exceed the ability of a human eye to detect slight movements. Additionally, the playback device may also have hardware and/or software limitations that prevent the playback device from displaying every frame of video. As such, playback of video at "real time" results in missing individual frames of video due to human viewing limitations and/or computer display limitations. The investigation playback speed is calculated based on the human viewing limitations and the display limitations of the particular device being used to view the investigation module 200.

Playback option window 250 allows the video sequence and/or the video from each camera to be played in various modes. The all frame display mode plays video at the calculated investigation playback speed wherein all frames are displayed and viewable during playback. The motion only display mode provides video sequences of the video that include motion. The trigger only display mode includes video sequences temporally related to a trigger.

Triggers include internal triggers and/or external triggers. Internal triggers include motion triggers defined by a user and determined by the video analytics module 140, POS triggers generated by the POS module 190 and analytics events defined by a tripline and/or a zone (e.g., entering and/or exiting a zone) and determined by the video analytics module 140. External triggers are generated by external hardware devices connected directly or indirectly to the computer 120.

At any point of the investigation the loss prevention individual may assign a video sequence to the timeline. For example, in FIG. 2 the loss prevention individual has added the second video sequence 220b to the investigation. The second video sequence 220b includes video provided from a camera positioned at the elevator and stairway. To further the scenario described hereinabove, suppose the loss prevention individual identified a suspect carrying the laptop and approaching an elevator displayed in the second video sequence 220b. In furtherance of the theft investigation, the loss prevention individual included the second video sequence 220b in the timeline of the investigation.

Loss prevention individual may select various options from the video clip window 260. The timeline window 220 may be populated with video clips including one or more video sequences, a still image generated from the video or text entered through the text entry window 214. A video clip may include a continuous video sequence. Alternatively, a video clip using the playback option of motion only (selected in the playback option window 250) includes a plurality of video sequences that include motion (e.g., non-motion portions of the video are excluded from the video clip). Finally, the loss prevention individual may capture a still image of a frame to capture an individual feature such as a facial image, a particular tool or object used during the theft, or any other significant image that may be required to further the investigation.

Finally, since the investigation is generated in near real-time, the loss prevention individual, upon confirmation of a theft currently in progress, is able to notify security and apprehend the thief before they are able to leave the premises.

In various embodiments, one or more of the video cameras 110 described above with reference to FIGS. 1 and 2 is an aerial drone camera 110 may be disposed, included as a part of, or is coupled to, one or more aerial drones 50 as shown in FIG. 4A (also sometimes referred to as unmanned aerial vehicles (UAV)). In further embodiments, the camera 110 may be a traffic camera 52 as shown in FIG. 4B, that is configured to capture images of one or more areas and/or subjects to be tracked. The aerial drone camera(s) 50 and/or traffic camera(s) 52 can be employed to perform various functions, such as, for example, the various functions of the video cameras 11015 described above with reference to FIGS. 1 and 2.

Figure 3:
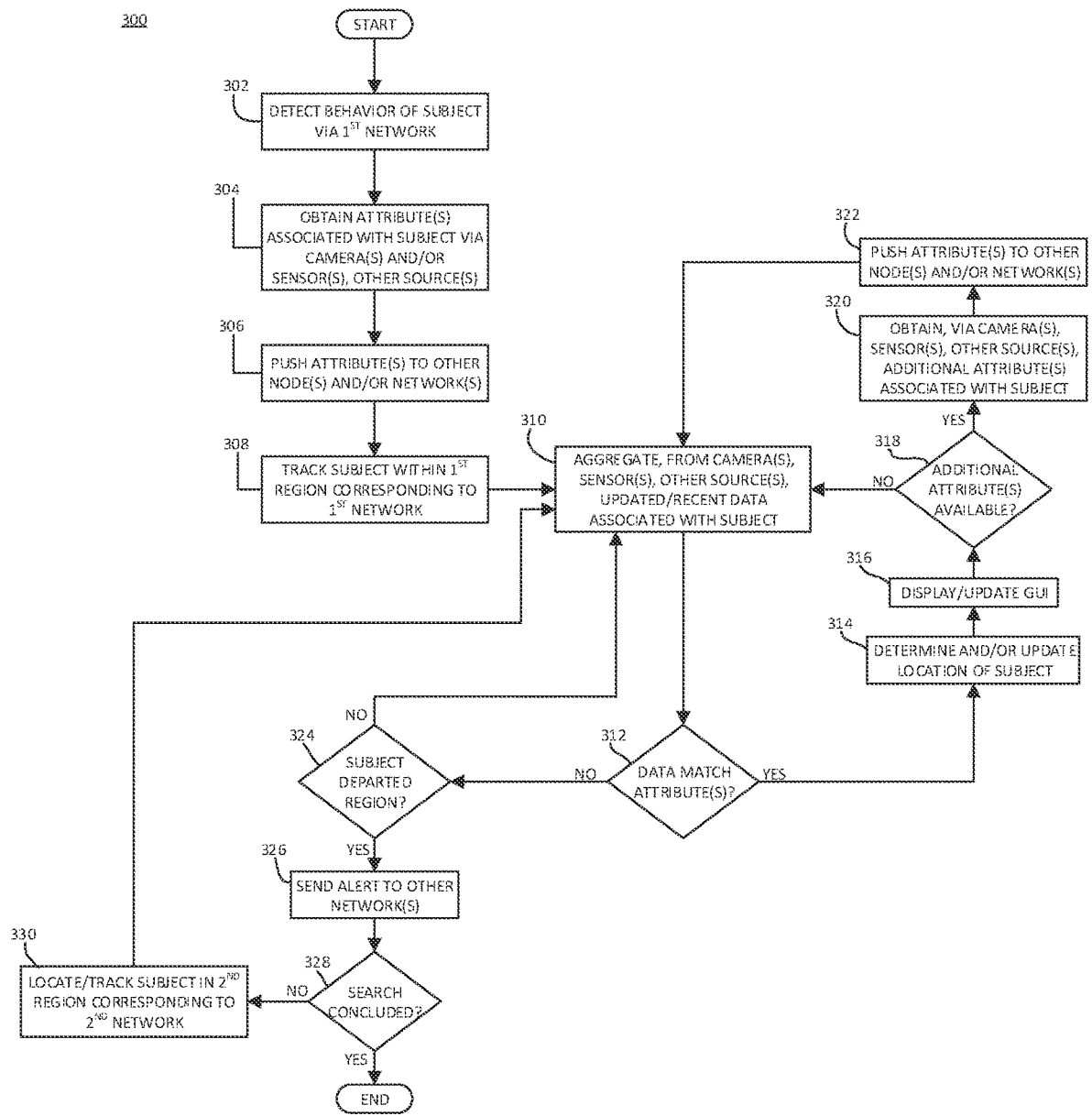
FIG. 3 is a flowchart illustrating an exemplary procedure for locating and/or tracking a location of one or more subjects in accordance with the present disclosure.

In another embodiment, with reference to FIG. 3, one or more aerial drone cameras 50 and/or traffic cameras 52 may be employed, in conjunction with one or more other sources of information in some instances, to perform a method 300 for locating and/or tracking a location of one or more subjects, such as a person who has been detected as having committed a crime at a particular location, across regions that correspond to one or more networks, such as an aerial drone camera network, a traffic camera network, a store camera network, and/or other types of networks. In this manner, communication among multiple nodes and/or networks, including nodes and/or networks that employ aerial drone cameras and/or traffic cameras, can cooperate to facilitate more effective location of subjects and/or tracking of locations of subjects.

At 302, a behavior of a subject is detected in a region, such as a retail store premises, that corresponds to a first network, such as a network including cameras 110, antennas 155, and/or the like. Although the method 300 is described in the context of a single subject or person, the method 300 is also applicable to multiple subjects, such as a group of people who are acting together or separately. Exemplary types of behaviors that can be detected at 302 include, without limitation, an action, an inaction, a movement, a plurality of event occurrences, a temporal event, an externally-generated event, the commission of a theft, the leaving of an unattended package, the commission of violence, the commission of a crime, and/or another type of behavior. In some example embodiments, in addition to, or as an alternative to, detecting a behavior of a subject at 302, an abnormal situation is detected, such as an abnormal condition (pre programmed condition(s)), an abnormal scenario (loitering, convergence, separation of clothing articles or backpacks, briefcases, groceries for abnormal time, etc.) or other scenarios based on behavior of elements (customers, patrons, people in crowd, etc.) in one or multiple video streams. For the sake of illustration, the description of the method 300 is provided in the context of detecting a behavior of a subject at 302, but the method 300 is similarly applicable to detecting an abnormal situation at 302.

Detection of the behavior of the subject includes obtaining information from one or more source(s), such as video and/or image information of the subject obtained via one or more video cameras 110 installed at or near a premises, non-video information (e.g., mobile communication device data) obtained from one or more antennas 155 installed at or near the premises, information provided by an employee or witness by way of a computer 120 at the premises, and/or other types of information obtained from other types of sources at or near the premises. Based on the obtained information, the behavior can be detected by way of the cameras 110 (in the case of smart cameras with such processing capability), and/or by a computer 120 or a server that is communicatively coupled to the cameras 110.

In various embodiments, there may be multiple types of cameras 110, such as smart cameras 110 that have processing capabilities to perform one or more of the functions described in connection with the method 300, and non-smart cameras that lack processing capabilities to perform one or more of the functions described in connection with the method 300. In general, any one or more of the functions described in connection with the method 300 may be performed in a centralized manner by one or more of the cameras (or other components of networks), and/or in a distributed manner by one or more of the cameras 110 and/or the computer 120, and/or the like. Additionally, the cameras, computers, and/or other components are configured, in some aspects, to communicate with one another to cooperate to execute the various functions of the method 400. For instance, in the event that a non-smart camera lacks processing capabilities to perform one or more of the functions described in connection with the method 400 (for example, a particular matching algorithm), the non-smart camera may communicate information (such as, for example, raw video data) to a smart camera and/or to a computer or other device that has the processing capabilities to perform the one or more particular functions described in connection with the method 400, so that the function(s) can be performed. Further, the non-smart camera may, in some aspects, forward to the smart camera, computer, or other device, information enabling the non-smart camera to be identified, so that if the non-smart camera captures an image of the subject, the location of the non-smart camera can be traced back and a location of the subject can be ascertained.

At 304, one or more attributes of the subject, or associated with the subject, are obtained from one or more sources. For example, an attribute of a face of the subject may be obtained by way of an image captured by way of a video camera 110, an attribute (e.g., a color, a type, and/or the like) of a clothing item that the subject is wearing can be obtained by way of an image captured by way of a video camera 110, mobile communication device data and/or a wireless signature of a mobile communication device or PDA 123 that the subject is carrying can be obtained by way of an antenna 155, and/or the like.

At 306, the one or more attributes that are associated with the subject and were obtained at 304 are transmitted or pushed to one or more other nodes (e.g., video cameras 110, antennas 155, and/or other devices resident on one or more networks) and/or networks, for instance, to enable those other nodes and/or networks to locate the subject and/or track a location of the subject. The attribute(s) can be transmitted to one or more nodes and/or networks by way of the network, or any suitable wired and/or wireless communication path or network.

At 308, a tracking loop is initiated to track a location of the subject within a first region that corresponds to the first network. The tracking loop, in some embodiments, includes performing the procedures described below in connection with 310, 312, 314, 316, 318, 320, and 322 for the particular region in which the tracking is commencing. In one example, the first region is the region where the behavior of the subject was initially detected at 302. For instance, the first region may be a retail store premises and the first network may be a network of the video cameras 110, the antennas 155, and/or the like that are installed at or near the first region. In some example embodiments, the tracking loop is performed in parallel for multiple regions (e.g., by employing multiple nodes and/or networks, such as networks of aerial drone cameras, traffic cameras, store premises, and/or the like) in to facilitate more comprehensive tracking of the location of the subject and/or to facilitate tracking of the location of the subject across a wide area. In a further embodiment, the tracking loop is performed in parallel for multiple regions corresponding to multiple networks, and the multiple networks collaborate in tracking the location of the subject to share the processing load and/or provide more accurate or rapid tracking results.

At 310, updated and/or more recent data associated with the subject is aggregated from various sources, such as one or more of the cameras 110, antennas 155, and/or other sources. Example types of data that can be aggregated at 310 include, without limitation, a facial image of the subject, an image of clothing worn by the subject, mobile communication device data and/or a wireless signature of a mobile communication device or PDA 123 carried by the subject, and/or other types of data.

At 312, a determination is made as to whether one or more items of data that were aggregated at 310 match the one or more attributes that were obtained at 304. For example, the determination at 312 may include comparing one or more items of data that were aggregated at 310 to the one or more attributes that were obtained at 304 to determine whether more recently captured data (such as, image data, video data, wireless communication data, and/or other types of data) correspond to the subject. In this manner, the determination at 312 can indicate whether the location of the subject in a particular region is still successfully being tracked, or whether the location of the subject is no longer successfully being tracked in the particular region and so a wider scoped search may be needed. In one example, the determination at 312 includes comparing an attribute (e.g., of a facial image) of the subject that was obtained at 304 to an attribute (e.g., of a facial image) of a person whose image was captured subsequent to the obtaining of the attribute at 304 (and, in some instance, by way of a different video camera 110) to determine whether the person whose image was subsequently captured matches the subject, thereby indicating that the location of the subject is still successfully being tracked.

In some embodiments, multiple types of attribute categories are arranged in hierarchical tiers according to complexity of processing required in detecting a match at 312. For example, a first tier of attributes for which the processing complexity required for detecting a match at 312 is minimal may include a clothing color or hair color associated with the subject. A second tier of attributes for which the processing complexity required for detecting a match at 312 is greater than that of the first tier of attributes may include mobile communication device data and/or wireless information relating to a mobile communication device carried by the subject and/or registered to the subject. A third tier of attributes for which the processing complexity required for detecting a match is even greater than that of the first and second tiers of attributes may include a gait of the subject. In this manner, depending on the tiers of attributes being employed for the matching at 312, and/or depending on the processing capabilities of the cameras 110, nodes, and/or other sources, processing of the matching at 312 can be redirected for completion by the appropriate device.

Referring now back to 312, if it is determined at 312 that one or more items of data that were aggregated at 310 match the one or more attributes that were obtained at 304 ("YES" at 312), then the method 300 progresses to 314. At 314, a location of the subject is determined based at least in part on the information aggregated at 310 and/or on other information. For example, the determining of the location of the subject at 314 includes, in some embodiments, computing a location of the subject based on a location of the camera 110 (or other source) from which the information was aggregated at 310.

At 316, information relating to the tracking of the location of the subject is displayed to a user (for example, a police officer or other emergency personnel) by way of a user interface, such as a graphical user interface (GUI). The GUI, in some examples, includes a map over which an overlay is displayed indicating a location of the subject being tracked. The GUI may also include additional information, such as one or more of the attributes of the subject being tracked, including for instance, a facial image of the subject obtained by way of one or more of the cameras 110, attributes of clothing worn by the user, an attribute of a mobile communication device carried by the user, a name or other information identifying the user generated, for instance, by matching the captured facial image of the subject to a facial image stored in a database of facial images, and/or the like. In this manner, the GUI enables the user to continually track the location of the subject throughout multiple regions that may correspond to multiple nodes and/or networks.

At 318, a determination is made as to whether any additional attribute associated with the subject being tracked is available. In some examples, the determination at 318 is based at least in part on one or more items of information— such as images of the subject, video of the subject, mobile communication device data and/or wireless signatures of mobile communication devices or PDAs 123 carried by the subject, and/or the like—that have been obtained thus far by way of the camera(s) 110, the antenna(s) 155, and/or other source(s). Example types of additional attributes that may be available include, without limitation, additional attributes of facial images captured of the subject having different angles and/or providing information beyond the information of previously obtained and recorded attributes, an attribute, such as a make, model, color, license plate number, of a vehicle that the subject has entered and is traveling in, and/or the like. By determining whether any additional attribute associated with the subject being tracked is available, a more comprehensive and robust profile of the subject may be compiled, thereby facilitating more accurate and efficient tracking of the location of the subject.

If it is determined at 318 that any additional attribute associated with the subject being tracked is available ("YES" at 318), then the method 300 proceeds to 320. At 320, the additional attribute associated with the subject being tracked is obtained by way of the camera(s) 110, the antenna(s) 155, and/or the other source(s), and is stored in a memory for later use. At 322, the additional attribute that was obtained at 320 is transmitted or pushed to one or more other nodes and/or networks, for instance, to enable those other nodes and/or networks to more effectively locate the subject and/or track a location of the subject. From 322, or if it is determined at 318 that no additional attribute associated with the subject being tracked is available ("NO" at 318), then the method 300 proceeds back to 310 to aggregate updated and/or more recent data associated with the subject to continually track the location of the subject throughout the region.

In some embodiments, at 318, in addition or as an alternative to determining whether any additional attribute associated with the subject being tracked is available, a determination is made as to whether any attribute associated with the subject being tracked has changed. For example, in some cases the subject may be tracked based on multiple attributes, such as a hair color, a clothing color, a height, a vehicle make, a vehicle model, a vehicle color, a vehicle license plate, mobile communication device data, and/or the like. The multiple attributes may originate from a variety of sources, such as an image of the subject previously captured by the video camera(s) 110, mobile communication device information previously captured by the antenna(s) 155, intelligence provided by law enforcement personnel, and/or the like. In this manner, when an image of a person is obtained by way of the cameras 110 and/or mobile communication device information associated with a person is obtained by way of the antennas(s) 155, the person can be identified as matching the subject who is being tracked with a degree of confidence that is proportional to the number of attributes of the person that are detected in the image as matching the multiple attributes that serve as the basis upon which the subject is being tracked. In some cases, one of the attributes of the subject may change. For example, the subject may remove a wig, change vehicles, change clothing, and/or the like in an effort to elude tracking and capture. In such cases, it may be determined at 318 that one or more of the multiple attributes have changed. In particular, if the cameras 110 and/or antennas 155 are no longer able to detect a person matching all of the multiple (for example, five) attributes being tracked, then the computer 120 may search for a person matching a lesser number (for example, four or fewer) of the attributes that were previously being tracked. If a person matching the lesser number of the attributes is detected by one or more of the cameras 110 and/or antennas 155, then that person may be flagged as a secondary subject to be tracked simultaneously while searching for the primary subject having attributes that match all the multiple attributes being tracked. If the person matching all of the multiple attributes is no longer locatable by the images captured via the cameras 110 and/or the information obtained by the antennas 155, then the secondary subject matching the lesser number of the attributes may be promoted to be the primary subject so that tracking resources may be appropriately and effectively allocated. In some cases, the change in attribute is verified before the secondary subject is promoted to being the primary subject. For example, the change in attribute may be verified by the processing of images captured via the cameras 110, which detect the subject discarding a clothing item or a wig. Alternatively, the change in attribute may be verified by law enforcement personnel who locate the discarded clothing item or wig. In this regard, the computer 120 may provide a location and time information to law enforcement personnel based on the last known or tracked location of the primary subject matching all of the multiple attributes, to enable the law enforcement to dispatch personnel to the location to conduct the verification. Additionally, when the subject is being tracked across multiple networks, the system 100 can push the updated list of attributes (for example, the lesser number of attributes) to one or more other nodes (e.g., cameras 110, antennas 155, and/or other devices resident on one or more networks) and/or networks. This facilitates improved adaptive tracking of subjects across multiple networks even when the subjects are expending effort to change their image to elude tracking and capture.

Referring back to 312, if it is determined that the one or more items of data that were aggregated at 310 do not match the one or more attributes that were obtained at 304 ("NO" at 312), then the method 300 proceeds to 324. At 324, a determination is made as to whether the subject has departed the region in which the subject previously was being tracked, for instance, the region corresponding to the premises at which the behavior was detected at 302. In some embodiments, the determination at 324 is based on the amount of time that has elapsed since the location of the subject was successfully being tracked. In particular, if the amount of time that has elapsed since the location of the subject was successfully being tracked exceeds a predetermined threshold, then it is determined at 324 that the subject has departed the region, and if the amount of time that has elapsed since the location of the subject was successfully being tracked does not exceed the predetermined threshold, then it is determined at 324 that the subject has not departed the region.

If it is determined at 324 that the subject has not departed the region in which the subject previously was being tracked ("NO" at 324), then the method 300 proceeds back to 310 to aggregate updated and/or more recent data associated with the subject to continually track the location of the subject throughout the region. If, on the other hand, it is determined at 324 that the subject has departed the region in which the subject previously was being tracked ("YES" at 324), then the method 300 progresses to 326. At 326, an alert is communicated to one or more other nodes and/or networks, by way of one or more wired and/or wireless communication paths, indicating that the subject has departed the first region in which the subject previously was being tracked, for instance, the region corresponding to the premises at which the behavior was detected at 302. In some embodiments, the alert is provided to a wide area of nodes and/or networks that are adjacent and/or proximal to the region in which the subject previously was being tracked. In this manner, the additional neighboring nodes and/or networks can attempt to locate the subject and/or track a location of the subject.

In some embodiments, the alert is provided to a select set of nodes and/or networks based on one or more factors that enable more efficient allocation of tracking resources. For example, a determination may be made as to whether any traffic cameras in the region have detected a traffic law violation, such as driving through a red light. If a traffic camera in the region has detected a traffic law violation, then, based on a prediction that the traffic law violation may have been committed by the subject fleeing the scene of a crime, the alert may be provided to one or more nodes and/or networks that overlap with a region of the traffic camera in an effort to quickly locate the customer without the need to utilize a wide array of cameras and/or other resources. In addition, based on the detection at 324 that the subject has departed the region in which the subject previously was being tracked, police or other emergency personnel can launch one or more aerial drone cameras 110 that can communicate attributes and other information with one another to facilitate a collaborative search plan, based in part on one or more neighboring regions of interest, to identify and/or track a location of the subject.

At 328, a determination is made as to whether the searching for, and/or tracking of, the location of the subject is concluded. In some embodiments, the determination at 328 is based on whether an instruction has been received from a police officer or other emergency personnel indicating that the search for the subject has been concluded, for instance, in a case where the subject has been apprehended and is in police custody. If it is determined at 328 that the searching for, and/or tracking of, the location of the subject is not concluded ("NO" at 328), then the method 300 proceeds to 330 where a tracking loop is initiated to identify and/or track a location of the subject within a second region that corresponds to a second network. The tracking loop, in some embodiments, includes performing the procedures described above in connection with 310, 312, 314, 316, 318, 320, and 322 for the particular region in which the tracking is commencing. If, on the other hand, it is determined at 328 that the searching for, and/or tracking of, the location of the subject is concluded ("YES" at 328), then the method 300 ends.

As various changes could be made in the above constructions without departing from the scope of the disclosure, it is intended that all matter contained in the above description shall be interpreted as illustrative and not in a limiting sense. It will be seen that several objects of the disclosure are achieved and other advantageous results attained, as defined by the scope of the following claims.

What is claimed is:

1. A system for tracking a subject, the system comprising:
   a first network associated with a first region, the first network including a first video camera configured to capture video of the subject, the first network configured to:
   obtain an attribute of the subject from the video;
   match the attribute of the subject to a stored attribute to identify the subject;
   track location of the subject within the first region based on the match, wherein the first region corresponds to a premises at which a particular subject behavior was detected;
   perform a determination of when the subject departs the first region; and issue an alert in response to the determination, wherein the alert indicates that the subject has departed the first region in which the subject previously was being tracked; and a second network associated with a second region, the second network including a second video camera configured to track the subject within the second region in response to the alert from the first network.

2. The system according to claim 1, further comprising a computer configured to receive the video from the first and second video cameras.

3. The system according to claim 2, wherein the computer includes a video analytics module configured to:
perform real-time video processing of the video to generate non-video data; and
analyze at least one of the video data or the non-video data to identify occurrences of the particular subject behavior.

4. The system according to claim 3, wherein the computer further includes an investigation generation module configured to generate an investigation containing at least one video sequence of the particular subject behavior.

5. The system according to claim 4, wherein the investigation generation module is configured to assign externally-generated data to the investigation.

6. The system according to claim 5, further comprising a POS system, wherein the computer receives the externally-generated data from the POS system and the externally-generated data includes at least one POS transaction.

7. The system according to claim 6, wherein the investigation generation module is configured to simultaneously manage and populate a plurality of investigations.

8. The system according to claim 1, wherein the second video camera is an aerial drone.

9. A method for tracking a subject, the method comprising:
capturing video of a subject within a first region using a first camera at a first network;
obtain an attribute of the subject from the video;
detecting activity of a subject within a first region being monitored by the first network;
storing an attribute of the subject;
matching the attribute of the subject to a stored attribute to identify the subject;
tracking location of the subject within the first region, wherein the first region corresponds to a premises at which a particular subject behavior was detected;
performing a determination of when the subject departs the first region;
issuing an alert in response to the determination, wherein the alert indicates that the subject has departed the first region in which the subject previously was being tracked; and
tracking the subject within a second region through a second video camera of a second network, in response to the alert from the first network.

10. The method according to claim 9, further comprising:
generating non-video data from the video wherein the non-video data includes data related to a particular subject behavior.

11. The method according to claim 10, further comprising:
identifying the particular subject behavior;
identifying at least one occurrence of the particular subject behavior within the video data; and
generating an investigation related to the particular subject behavior.

12. The method according to claim 11, wherein the identifying the particular subject behavior further includes:
defining the particular subject behavior as at least one of an action, an inaction, a movement, a plurality of event occurrences, a temporal event, or an externally-generated event.

13. The method according to claim 9, wherein the second video camera is an aerial drone.

14. A video observation, surveillance, and verification system comprising:
a first network associated with a first region, the first network including a first video camera configured to capture a first video of a subject;
a second network associated with a second region, the second network including a second video camera configured to capture a second video of the subject;
a computer communicatively coupled to the first and second networks;
one or more antennae configured to capture mobile communication device data from one or more mobile communication devices within a range of the one or more antennae and to transmit the captured mobile communication device data to the computer;
a video data analytics module configured to:
process the first video captures by the first video camera;
obtain an attribute of the subject from the first video;
match the attribute of the subject to a stored attribute to identify the subject;
track location of the subject within the first region based on the match, wherein the first region corresponds to a premises at which a particular subject behavior was detected;
perform a determination of when the subject departs the first region; and
issue an alert in response to the determination, wherein the alert indicates that the subject has departed the first region in which the subject previously was being tracked; and
configured to track the subject within the second region in response to the alert from the first network.

15. The system according to claim 14, further comprising a point of sale (POS) module configured to receive POS transaction information and convert the POS transaction information into events for processing by the computer.

16. The system according to claim 14, wherein the computer is further configured to perform operations based on software instructions for monitoring user behavior, wherein user behavior is defined by actions, inactions, movements, a plurality of event occurrences, temporal events, externally-generated events, or any combination thereof.

17. The system according to claim 14, wherein the video data analytics module is further configured to:
perform real-time video processing of the video to generate non-video data; and
analyze at least one of the video data or the non-video data to identify occurrences of the particular subject behavior.

18. The system according to claim 17, further comprising a matching algorithm configured to compare defined characteristics of user behavior with behavior identified in non-video data to generate investigations based on matches found.

* * * * *